United States Patent
Cartella et al.

(10) Patent No.: US 12,366,434 B2
(45) Date of Patent: Jul. 22, 2025

(54) APPARATUS AND METHOD FOR DEFENDING A PREDETERMINED AREA FROM AN AUTONOMOUSLY MOVING UNMANNED AERIAL VEHICLE

(71) Applicant: Sony Group Corporation, Tokyo (JP)

(72) Inventors: Francesco Cartella, Stuttgart (DE); Orlando Anunciacao, Stuttgart (DE); Karin Cvetko Vah, Stuttgart (DE); Olivier Elshocht, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 200 days.

(21) Appl. No.: 18/169,226

(22) Filed: Feb. 15, 2023

(65) Prior Publication Data
US 2023/0266102 A1    Aug. 24, 2023

(30) Foreign Application Priority Data
Feb. 22, 2022    (EP) .................. 22157869

(51) Int. Cl.
*F41H 11/02*    (2006.01)
*G05D 1/00*    (2006.01)
*G08G 5/70*    (2025.01)
*B64U 10/00*    (2023.01)

(52) U.S. Cl.
CPC .............. *F41H 11/02* (2013.01); *G05D 1/12* (2013.01); *G08G 5/70* (2025.01); *B64U 10/00* (2023.01); *B64U 2201/10* (2023.01)

(58) Field of Classification Search
CPC ...... F41H 11/02; G08G 5/0073; G08G 5/006; B64U 10/00; B64U 2201/10
See application file for complete search history.

(56) References Cited

U.S. PATENT DOCUMENTS

| | | | | |
|---|---|---|---|---|
| 2020/0064443 A1* | 2/2020 | Yoon | ...................... | B64U 10/30 |
| 2020/0312163 A1* | 10/2020 | Dürr | ..................... | G08G 5/0069 |
| 2022/0058815 A1* | 2/2022 | Xu | .......................... | G06N 20/00 |
| 2023/0266102 A1* | 8/2023 | Cartella | .................. | F41H 11/02 |
| | | | | 701/3 |

FOREIGN PATENT DOCUMENTS

WO    2020/181391 A1    9/2020

OTHER PUBLICATIONS

Kelsey Atherton, "Loitering munitions preview the autonomous future of warfare" TechStream, Available Online At: https://www.brookings.edu/techstream/loitering-munitions-preview-the-autonomous-future-of-warfare/, Aug. 4, 2021, 8 pages.

(Continued)

*Primary Examiner* — Kito R Robinson
*Assistant Examiner* — Roy Rhee
(74) *Attorney, Agent, or Firm* — XSENSUS LLP (57) ABSTRACT

A method for defending a predetermined area from an autonomously moving Unmanned Aerial Vehicle (UAV) is provided. The method includes generating one or more adversarial example adapted to disrupt a machine-learning based vision system of the UAV. Additionally, the method includes determining, based on geographical information about at least one of the predetermined area and a surrounding area of the predetermined area, a respective position for the one or more adversarial example in at least one of the predetermined area and the surrounding area of the predetermined area.

20 Claims, 3 Drawing Sheets

(56) References Cited

OTHER PUBLICATIONS

Andy Greenberg, "Split-Second 'Phantom' Images Can Fool Tesla's Autopilot", Available Online At: https://www.wired.com/story/tesla-model-x-autopilot-phantom-images/, Nov. 10, 2020, 4 pages.

Raja Ashok et al; "Blur the Eyes of UAV: Effective Attacks on UAV-based Infrastructure Inspection", 2021 IEEE 33rd International Conference on Tools With Artificial Intelligence (ICTAI), IEEE, Nov. 1, 2021 (Nov. 1, 2021), pp. 661-665, XP034055663, DOI:10.1109/ICTAI52525.2021.00105.

* cited by examiner

APPARATUS AND METHOD FOR DEFENDING A PREDETERMINED AREA FROM AN AUTONOMOUSLY MOVING UNMANNED AERIAL VEHICLE

CROSS-REFERENCE TO RELATED APPLICATION

This patent application claims priority to European Patent Application No. 22157869.3, filed on Feb. 22, 2022, the entire disclosure of which is incorporated herein by reference.

FIELD

The present disclosure relates to defending from an Unmanned Aerial Vehicles (UAV). In particular, examples of the present disclosure relate to an apparatus and a method for defending a predetermined area from an autonomously moving UAV.

BACKGROUND

Events with massive audience participation like football matches, concerts or big assemblies are occasions that require particular attention in terms of security measures. To guarantee that the event takes place as planned and to ensure the safety of participants, defense authorities put in place several protective measures to avoid threats like protest manifestations or terrorist attacks.

In big public events, particular attention is usually reserved to threats coming from the air, by means of flying vehicles. For this purpose, no-fly zones are usually imposed by federal aviation authorities, where any flying object is prohibited to fly over a sufficiently large area around the event venue and for a duration spanning around the event time.

Next to larger flying vehicles, like planes, airships, hang-gliders and parachutes, UAVs such as drones are gaining more and more attention due to their increasing popularity and usage. In fact, drones may represent a bigger security threat than larger aircrafts, given their affordable prices, ease of piloting and large availability.

A series of detection and preventive actions are usually put in place by authorities, with the intent of reacting in case some drone would violate the no-fly zone. Defenses against drone intrusions usually consist of two phases. At first, offenders are detected using standard equipment like radars or human sentinels placed on buildings surrounding the main event venue. Once a threat is identified and confirmed, a second phase consists of pushing away the drone, to avoid that it reaches its target. Standard techniques to obstacle drone navigation consist of signal jammers (i.e. electromagnetic radio wave emitters pointed at the invader drone) with the goal of disturbing the communication channel between the drone and its remote command. The main effect of this action is that, as soon as the signal between the remote command and the drone is interrupted, the drone activates the "back home" functionality and returns to its take-off point. In some cases, by tracking the drone path, is also possible to identify the responsible of the violation.

Several technological advances have been recently made in drone design, with the introduction of innovative functionalities and smart navigation systems aiming to make drones more and more autonomous and less dependent by human control. Among the most advanced navigation systems for autonomous drones, those relying on computer vision are gaining increasing popularity. Once a specific destination is set, drones equipped with those systems are able to determine their position in real time by recognizing, using artificial intelligence, buildings, roads or natural landmarks from video streams captured with cameras mounted on board of the aircraft. In this way, drones can reach target destinations without the need of human control. Among other consequences, the absence of a communication channel with the ground makes signal jammer ineffective as a defensive strategy to keep away drones invading no-fly zones.

Hence, there may be a demand for defending an area such as a no-fly zone from an autonomously moving UAV such as a drone.

SUMMARY

This demand is met by apparatuses and methods in accordance with the independent claims. Advantageous embodiments are addressed by the dependent claims.

According to a first aspect, the present disclosure provides a method for defending a predetermined area from an autonomously moving UAV. The method comprises generating one or more adversarial example adapted to disrupt a machine-learning based vision system of the UAV. Additionally, the method comprises determining, based on geographical information about at least one of the predetermined area and a surrounding area of the predetermined area, a respective position for the one or more adversarial example in at least one of the predetermined area and the surrounding area of the predetermined area.

According to a second aspect, the present disclosure provides an apparatus for defending a predetermined area from an autonomously moving UAV. The apparatus comprises input interface circuitry configured to receive geographical information about at least one of the predetermined area and a surrounding area of the predetermined area. Additionally, the apparatus comprises processing circuitry configured to generate one or more adversarial example adapted to disrupt a machine-learning based vision system of the UAV. The processing circuitry is further configured to determine, based on the geographical information, a respective position for the one or more adversarial example in at least one of the predetermined area and the surrounding area of the predetermined area.

According to a third aspect, the present disclosure provides a non-transitory machine-readable medium having stored thereon a program having a program code for performing the proposed method for defending a predetermined area from an autonomously moving UAV, when the program is executed on a processor or a programmable hardware.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

Figure 1:
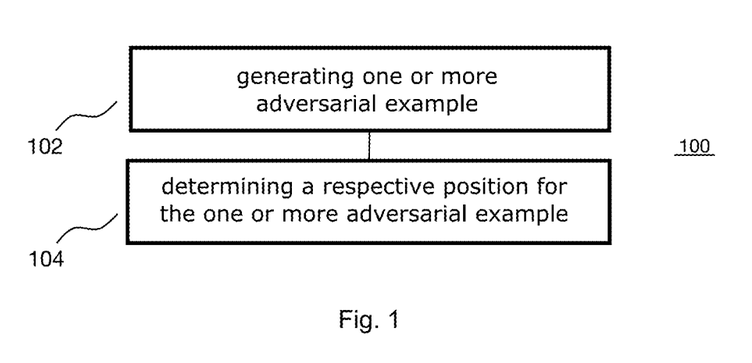
FIG. 1 illustrates a flowchart of an example of a method for defending a predetermined area from an autonomously moving UAV.

FIG. 1 illustrates a flowchart of an exemplary (e.g. computer-implemented) method 100 for defending a predetermined area from an autonomously moving UAV. The predetermined area is a defined geographical area such as a no-fly zone, an area including and/or surrounding one or more specific building (e.g. a public building, a sports stadium or a multipurpose arena), an area including and/or surrounding a landmark, an area including and/or surrounding an event venue, or a restricted area (e.g. a military area). The term "defending" is to be understood such that the autonomously moving UAV is prevented (hindered) from recognizing the predetermined area and, hence, from performing an (e.g. planned) action in the predetermined area.

The method 100 is designed for UAVs using a machine-learning based vision system (vision tracker) for navigation. A UAV using a machine-learning based vision system for navigation is able to determine its position in real time. The UAV uses one or more machine-learning model and optionally further means of artificial intelligence to determine its position by recognizing buildings, roads or natural landmarks from one or more video stream captured with one or more camera mounted on board of the UAV. Accordingly, once a specific target destination is set, the UAV is able to autonomously navigate to the target destination, i.e., the UAV is able to navigate to the target destination without the need of human control.

The method 100 comprises generating 102 one or more adversarial example adapted to disrupt (perturb, impede) the machine-learning based vision system of the UAV. An adversarial example is an input to a machine-learning model to cause the machine-learning model to make a mistake. The one or more adversarial example is intentionally designed to confuse the machine-learning model used by the UAV for position determination based on the recorded video data.

The one or more adversarial example is effectively an optical illusion for the machine-learning based vision system. For example, the adversarial example may comprise a specifically designed noise or perturbation to elicit misclassification by the machine-learning model. The adversarial example may look "normal" to humans, i.e., the adversarial example may be designed such that a human cannot recognize the noise or perturbation eliciting the misclassification by the machine-learning model. For example, if an adversarial example is installed on a roof of a building, the adversarial example may cause the machine-learning based vision system of the UAV to misclassify the building as a river or a forest.

Various approaches are known for generating adversarial examples. For example, the Fast Gradient Signed Method (FGSM), the gradient-based evasion attack method, the Projected Gradient Descent (PGD) method, the Carlini and Wagner (C&W) attack method or the adversarial patch attack method may be used for generating 102 the one or more adversarial example. However, it is to be noted that the present disclosure is not limited to the above exemplary approaches for generating adversarial examples. Other techniques for generating adversarial examples may be used as well. As is evident from the above example, the one or more adversarial example may be generated using a trained machine-learning model.

The method 100 additionally comprises determining 104 a respective (e.g. ideal) position for the one or more adversarial example in at least one of the predetermined area and a surrounding area of the predetermined area. The respective (e.g. ideal) position for the one or more adversarial example is determined based on geographical information about at least one of the predetermined area and the surrounding area of the predetermined area. The surrounding area of the predetermined area is a defined geographical area that connects to and at least partly encloses the predetermined area. The geographical information indicate one or more geographical properties (features) of the predetermined area and/or the surrounding area of the predetermined area. For example, the geographical information may indicate presence of one or more object such as buildings, rivers, hills, forests, nature conservation areas in the predetermined area and/or the surrounding area of the predetermined area. Additionally, the geographical information may indicate further detailed information about one or more object present in the predetermined area and/or the surrounding area of the predetermined area. For example, the geographical information may indicate a height of a building, a reflectivity of a building, a height of a hill or a steepness of a hill. The geographical information may, e.g., be provided by means of a geographical map representing the predetermined area and/or the surrounding area of the predetermined area. The map may be augmented with additional information about one or more object depicted in the map—analogously to what is described above.

The method 100 may allow to generate one or more effective adversarial example and determine their optimal position in the predetermined area and/or the surrounding area of the predetermined area. Accordingly, when placing the one or more adversarial example at the respective determined position, the navigation of the autonomously moving UAV may be disrupted (fooled, confused) such that the UAV cannot recognize the predetermined area and/or the surrounding area of the predetermined area. As the UAV cannot recognize the predetermined area and/or the surrounding area of the predetermined area, the UAV cannot reach the predetermined area and, hence, not perform an (e.g. planned) action in the predetermined area. For example, the one or more adversarial example may allow to induce the UAV's navigation system to take a wrong direction and, hence, hinder the UAV to reach the predetermined area.

The method 100 may, e.g., be used to defend a no-fly zone, which is an example for a predetermined area.

Determining 104 the respective position for the one or more adversarial example may comprise several aspects. For example, determining 104 the respective position for the one or more adversarial example may comprise determining a respective ideal theoretical position for the one or more adversarial example. The ideal theoretical position of an adversarial example may be a position in the predetermined area and/or the surrounding area of the predetermined area that is ideal for disrupting the machine-learning based vision system of the UAV, but that does not take into account geophysical constraints of the predetermined area and/or the surrounding area of the predetermined area. In other words, the respective ideal theoretical position is a position for the placement of the respective adversarial example that provides the highest accuracy for fooling the UAV's machine-learning based vision system. For example, if a plurality of adversarial examples are determined, the ideal positions of the plurality of adversarial examples may be such that the plurality of adversarial examples are placed at a certain pattern and/or at certain distances with respect to each other. Similarly, the respective ideal theoretical position of the one or more adversarial example may be an ideal positioning of the one or more adversarial example in the surrounding of the predetermined area such that UAV is likely to turn before actually reaching the predetermined area. For example, the respective ideal theoretical position of the one or more adversarial may be an ideal respective distance of the one or more adversarial example to a perimeter of the predetermined area.

However, geophysical constraints may obstruct placement of the one or more adversarial example at the respective ideal theoretical position. A geophysical constraint is anything that limits or hinders placement of an adversarial example at a specific location. For example, a river may be located at the ideal theoretical position of one of the one or more adversarial example such that the one adversarial example cannot be placed at its ideal theoretical position. In case a building with high reflectivity reflects lot of sun light onto the ideal theoretical position for one of the one or more adversarial example, the visibility of the one adversarial example at the ideal theoretical position may be low for the UAV. Similarly, the ideal theoretical position of one of the one or more adversarial example may be between two high buildings such that the visibility of the one adversarial example at the ideal theoretical position may be low for the UAV. Accordingly, the effectivity of the one adversarial example for disruption the UAV's machine-learning based vision system might be significantly reduced at the respective ideal theoretical position. Therefore, determining 104 the respective position for the one or more adversarial example may further comprise determining one or more geophysical constraint for placement of the one or more adversarial example. The one or more geophysical constraint for placement of the one or more adversarial example are determined based on the geographical information about at least one of the predetermined area and the surrounding area of the predetermined area.

Further, determining 104 the respective position for the one or more adversarial example may comprise determining, based on the one or more geophysical constraint and the respective ideal theoretical position for the one or more adversarial example, the respective position of the one or more adversarial example in the at least one of the predetermined area and the surrounding area of the predetermined area. In other words, the respective position of the one or more adversarial example is determined taking into account the geophysical constraints of the predetermined area and/or the surrounding area of the predetermined area. Accordingly, the best respective physical position for placing the one or more adversarial example is determined. For example, the respective ideal theoretical position for at least some of the one or more adversarial example may be shifted based on the one or more geophysical constraint in order to increase a visibility of the one or more adversarial example for the UAV. Accordingly, determining, based on the one or more geophysical constraint and the respective ideal theoretical position for the one or more adversarial example, the respective position of the one or more adversarial example in the at least one of the predetermined area and the surrounding area of the predetermined area may comprise maximizing one or more visibility metric indicating a visibility of the one or more adversarial example for the UAV. However, the present disclosure is not limited thereto. Other approaches for determining the respective position of the one or more adversarial example based on the one or more geophysical constraint and the respective ideal theoretical position for the one or more adversarial example may be used as well.

The one or more adversarial example may be generated based on a model of a generic machine-learning based vision system. Adversarial examples are known to transfer across machine-learning models. That is, a same perturbed input is often misclassified by different machine-learning models despite being generated to mislead a specific architecture. Accordingly, generating the one or more adversarial example based on a model of a generic machine-learning based vision system may allow to disrupt different machine-learning based vision systems without specifically adapting the one or more adversarial example to the individual machine-learning based vision systems. No knowledge about the specific architecture of the different machine-learning based vision systems is needed.

In alternative examples, the one or more adversarial example may be generated based on information about a model series of the UAV. In other words, the one or more adversarial example may be fine-tuned to the specific machine-learning based vision systems of a specific UAV. For example, a generation model may be selected from a plurality of generation models (e.g. machine learning models) based on the information about the model series of the UAV. Accordingly, the one or more adversarial example may be generated with the selected generation model. This may allow to increase an effectivity of the one or more adversarial example for disrupting the UAV's machine-learning based vision system.

The information about the model series of the UAV may be determined in various ways. For example, the air space may be monitored using one or more camera. Accordingly, in some examples, the method 100 further comprises monitoring an air space of at least one of the predetermined area and the surrounding area of the predetermined area with one or more camera. Further, the method 100 may comprise determining, based on output data of the one or more camera, whether the UAV is present in the air space. Presence of the UAV in the air space may be determined using known object recognition and classification methods. If it is determined that the UAV is present in the air space, the method 100 may further comprise determining the model series of the UAV based on the output data of the one or more camera. For example, object classification methods may be used for determining the model series of the UAV. The determination of the model series of the UAV may be done in real-time according to examples of the present disclosure.

The method 100 may further comprise placing the one or more adversarial example at the respective determined position. For example, one or more object (e.g. a sign or a billboard) showing a respective one of the one or more adversarial example may be positioned at the respective determined position. Alternatively or additionally, at least one of the one or more adversarial example may be projected onto a respective object at the respective determined position. For example, an adversarial example may be projected onto a wall of a building at the determined position for the adversarial example. Further alternatively or additionally, one or more display displaying a respective one of the one or more adversarial example may be placed at the respective determined position. The display may face the air space (sky). According to examples, one or more defending UAV equipped with a respective one of the one or more adversarial example (e.g. holding a sign or a display showing the respective one of the one or more adversarial example) may be caused to fly at the respective determined position. However, it is to be noted that the present disclosure is not limited to the above examples for placing the one or more adversarial example at the respective determined position. Other techniques for placing the one or more adversarial example at the respective determined position may be used as well.

The method 100 may be used as an additional measure to increase the security level for the various scenarios described above. It may be used in combination with existing technologies to increase security and protection against a wider family of autonomous UAVs.

Figure 2:
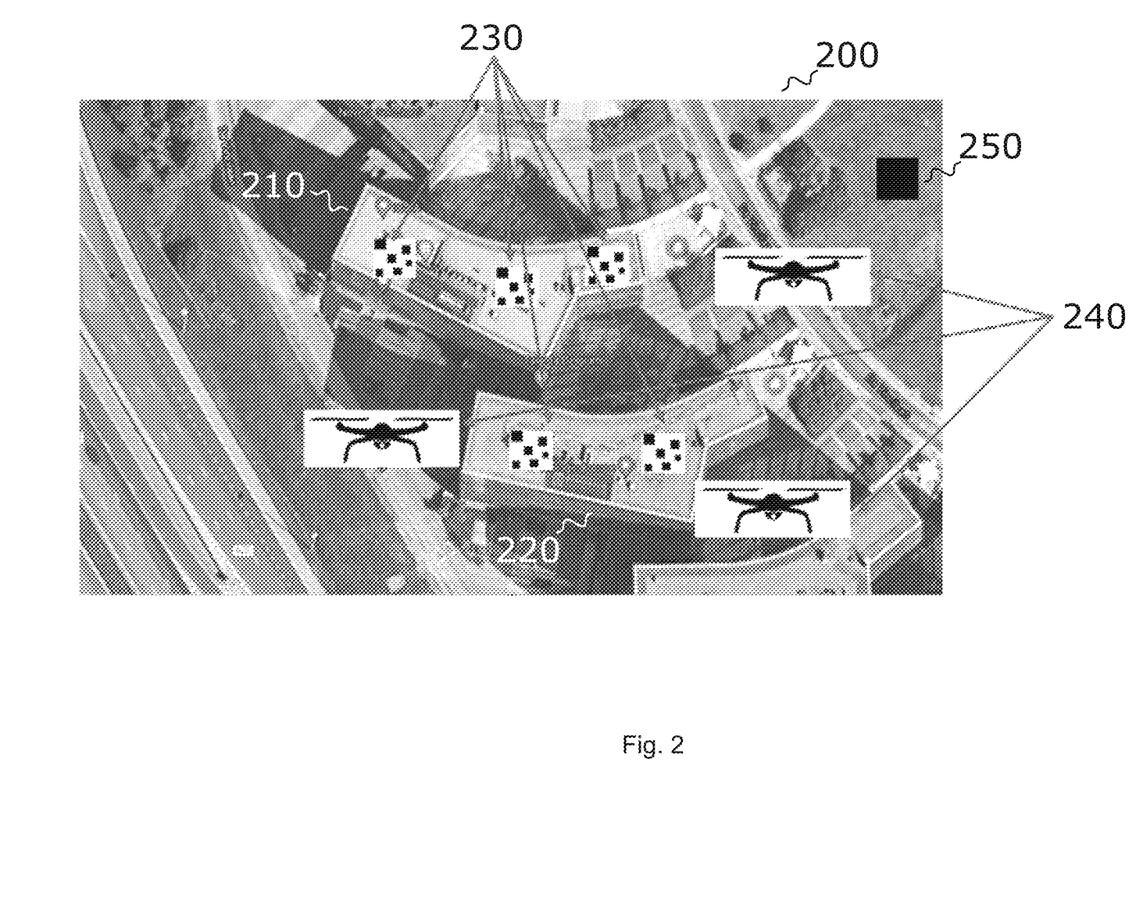
FIG. 2 illustrates an exemplary geographical area provided with adversarial examples.

FIG. 2 illustrates an exemplary geographical area 200 provided with adversarial examples.

Two buildings 210 and 220 are located in the geographical area 200. Autonomously moving UAVs are to be prevented from reaching the buildings 210 and 220. Therefore, a plurality of adversarial examples and a respective position for the respective adversarial example are determined according to the method 100. In the example of FIG. 2, five adversarial examples are placed as adversarial patches 230 on the roofs of the buildings 210 and 220. Additionally, three defending UAVs 240 equipped with a respective adversarial example are caused (controlled) to fly at the respective determined position for the respective adversarial example.

The adversarial examples 230 and 240 placed on and around the buildings 210 and 220 induce the machine-learning based vision system of an UAV to make mistakes when trying to recognize the buildings 210 and 220. Accordingly, the adversarial examples 230 and 240 may be understood as disturbances for defending the no-fly zone around the buildings 210 and 220 against UAVs such as drones. The adversarial examples 230 and 240 allow to inhibit the correct positioning of a violating UAV by confusing its vision systems. For example, the UAV's navigation system may be induced to take a wrong direction, avoiding that it reaches the buildings 210 and 220. The physical adversarial patches 230 specifically designed to fool the vision systems of a UAV may be deployed in different forms such as, e.g., adversarial panels or display screens that can be installed on top of the buildings 210 and 220 or around the no-fly zone perimeter. The defensive defending UAVs 240 may, e.g., be equipped with special patches and create a defensive shield by flying around the venue (e.g. the buildings 210 and 220) to be protected.

For example, an optimization engine such as a software-based module may be used to determine the adversarial examples 230 and 240 and their respective position. Accordingly, effective adversarial examples and their optimal position around the perimeter of the no-fly zone around the buildings 210 and 220 may be determined.

For example, the module may run optimization methods to generate adversarial examples able to fool a generic vision tracker. The resulting adversarial examples 230 and 240 are effective (with high probability) on any other machine-learning based vision system due to the transferability property of adversarial examples. Simultaneously, the best physical positions where the adversarial examples 230 and 240 should be installed are determined. The optimization process jointly considers the best theoretical positions that achieve the highest accuracy but also the geophysical constraints (e.g. buildings, mountains, rivers, . . . ) of the surrounding area. For example, a geographical map (or an equivalent representation) of the area may be provided as input.

As an alternative, a drone model detector may be used to maximize the probability of success. By using the drone model detector, the adversarial examples 230 and 240 can be fine-tuned on specific vision trackers or on specific UAV models. The recognition of the attacking UAV model may happen in real time through one or more cameras installed, e.g., around the perimeter of the no-fly zone. An exemplary camera 250 is illustrated in FIG. 2. Whenever an attacking UAV violates the prohibited area, the cameras communicate with a, e.g., centralized module that runs an object recognition software capable of determining the model of the attacking UAV from the cameras' video streams. According to the retrieved information on the UAV type, the centralized module determines the optimal specific pattern of adversarial examples to be displayed.

Figure 3:
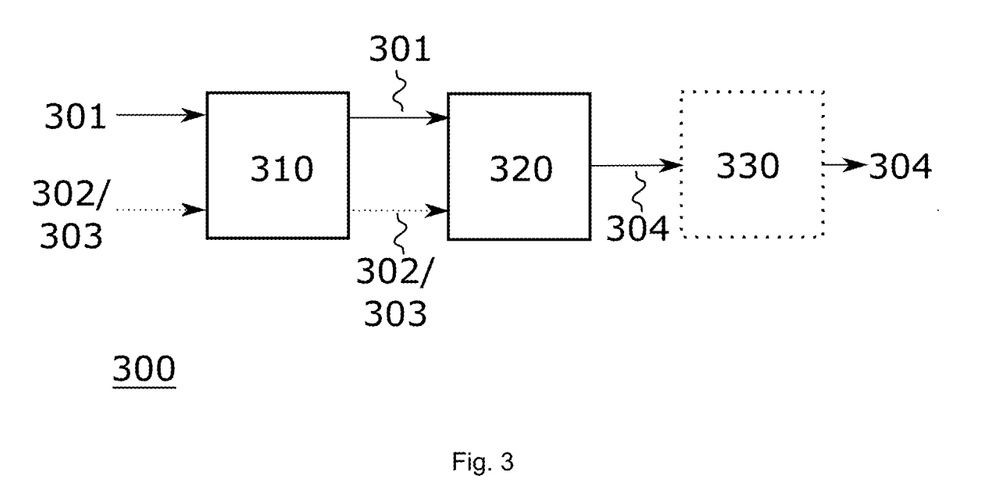
FIG. 3 illustrates an example of an apparatus for defending a predetermined area from an autonomously moving UAV.

FIG. 3 illustrates an exemplary apparatus 300 for defending a predetermined area from an autonomously moving UAV according to the above-described principles of the proposed technique.

The apparatus 300 comprises input interface circuitry 310 configured to receive (data indicating) geographical information 301 about at least one of the predetermined area and a surrounding area of the predetermined area. The input interface circuitry 310 may be adapted for wireless coupling (e.g. according to a wireless communication standard such as IEEE 802.11 or IEEE 802.15.1 of the Institute of Electrical and Electronics Engineers, IEEE) or wired coupling (e.g. by means of a cable) to an entity (e.g. a database) providing the geographical information 301.

Additionally, the apparatus 300 comprises processing circuitry 320. For example, the processing circuitry 320 may be a single dedicated processor, a single shared processor, or a plurality of individual processors, some of which or all of which may be shared, a digital signal processor (DSP) hardware, an application specific integrated circuit (ASIC), a neuromorphic processor or a field programmable gate array (FPGA). The processing circuitry 320 may optionally be coupled to, e.g., read only memory (ROM) for storing software, random access memory (RAM) and/or non-volatile memory. The processing circuitry 320 is coupled to the input interface circuitry 310 and used for performing the proposed method for defending a predetermined area from an autonomously moving UAV.

In particular, the processing circuitry 320 is configured to generate one or more adversarial example adapted to disrupt a machine-learning based vision system of the UAV. The processing circuitry 320 may, e.g., be configured to generate the one or more adversarial example using a trained machine-learning model as described above. The processing circuitry 320 is further configured to determine, based on the geographical information, a respective position for the one or more adversarial example in at least one of the predetermined area and the surrounding area of the predetermined area.

Similarly to what is described above for the method 100, also the apparatus 300 may allow to generate one or more effective adversarial example and determine their optimal position in the predetermined area and/or the surrounding area of the predetermined area. Accordingly, when placing the one or more adversarial example at the respective determined position, the navigation of the autonomously moving UAV may be disrupted (fooled, confused) such that the UAV cannot recognize the predetermined area and/or the surrounding area of the predetermined area. As the UAV cannot recognize the predetermined area and/or the surrounding area of the predetermined area, the UAV cannot reach the predetermined area and, hence, not perform an (e.g. planned) action in the predetermined area.

The processing circuitry 320 may optionally be configured to perform one or more of the above-described further aspects of the method 100.

For example, for determining the respective position for the one or more adversarial example, the processing circuitry 320 may be configured to determine a respective ideal theoretical position for the one or more adversarial example. Further, the processing circuitry 320 may be configured to determine, based the on geographical information about at least one of the predetermined area and the surrounding area of the predetermined area, one or more geophysical constraint for placement of the one or more adversarial example. The processing circuitry 320 may be configured to determine, based on the one or more geophysical constraint and the respective ideal theoretical position for the one or more adversarial example, the respective position of the one or more adversarial example in the at least one of the predetermined area and the surrounding area of the predetermined area. Accordingly, the best respective physical position for placing the one or more adversarial example may be determined.

As described above, the processing circuitry 320 may be configured to generate the one or more adversarial example based on a model of a generic machine-learning based vision system. Alternatively, the processing circuitry 320 may be configured to generate the one or more adversarial example based on information 302 about a model series of the UAV.

For generating the one or more adversarial example based on the information about the model series of the UAV, the processing circuitry 320 may—analogously to what is described above—be configured to select a generation model from a plurality of generation models based on the information about the model series of the UAV, and generate the one or more adversarial example with the selected generation model.

Optionally, the apparatus 320 may comprise or be coupled to (e.g. via the input interface circuitry 310) one or more camera such as the camera 250 illustrated in FIG. 2. The one or more camera is configured to monitor an air space of at least one of the predetermined area and a surrounding area of the predetermined area. Accordingly, the input interface circuitry 310 may be further configured to receive output data 303 of the one or more camera. Analogously to what is described above, the processing circuitry 320 may be further configured to determine, based on output data 303 of the one or more camera, whether the UAV is present in the air space. If it is determined that the UAV is present in the air space, the processing circuitry 320 may be further configured to determine the model series of the UAV based on the output data of the one or more camera. That is, the information 302 about the model series of the UAV may effectively be included in the output data 303 of the one or more camera. The processing circuitry 320 may be configured to determine the model series of the UAV in real-time.

The processing circuitry 320 may optionally be configured to generate control data 304. The control data 304 may be used to control various means enabling display of the one or more adversarial example. For example, the processing circuitry 320 may be configured to generate control data 304 for one or more optical projector to control the one or more optical projector to project a respective one of the one or more adversarial example onto a respective object at the respective determined position. Alternatively or additionally, the processing circuitry 320 may be configured to generate control data 304 for one or more display at the respective determined position to control the one or more display to display a respective one of the one or more adversarial example. Further alternatively or additionally, the processing circuitry 320 may be configured to generate control data 304 for one or more defending UAV equipped with a respective one of the one or more adversarial example to control the one or more defending UAV to fly at the respective determined position. Further details about the displaying of the one or more adversarial example using at least one of the one or more optical projector, the one or more optical display and the one or more defending UAV are given with respect to FIG. 1 and FIG. 2.

The apparatus 300 may additionally comprise output interface circuitry 330 configured to output the control data 304. The output interface circuitry 330 may be adapted for wireless coupling (e.g. according to a wireless communication standard such as IEEE 802.11 or IEEE 802.15.1 of the Institute of Electrical and Electronics Engineers, IEEE) or wired coupling (e.g. by means of a cable) to at least one of the one or more optical projector, the one or more optical display and the one or more defending UAV.

The output interface circuitry 330 may further be configured to output data indicating the one or more adversarial example and the respective position for the one or more adversarial example.

The apparatus 300 may comprise further hardware—conventional and/or custom.

Examples of the present disclosure may enable defending no-fly zones from autonomous drones using adversarial examples.

The following examples pertain to further embodiments:

(1) A method for defending a predetermined area from an autonomously moving UAV, the method comprising:
- generating one or more adversarial example adapted to disrupt a machine-learning based vision system of the UAV; and
- determining, based on geographical information about at least one of the predetermined area and a surrounding area of the predetermined area, a respective position for the one or more adversarial example in at least one of the predetermined area and a surrounding area of the predetermined area.

(2) The method of (1), wherein determining the respective position for the one or more adversarial example comprises:

determining a respective ideal theoretical position for the one or more adversarial example; determining, based on the geographical information about the at least one of the predetermined area and the surrounding area of the predetermined area, one or more geophysical constraint for placement of the one or more adversarial example; and determining, based on the one or more geophysical constraint and the respective ideal theoretical position for the one or more adversarial example, the respective position of the one or more adversarial example in the at least one of the predetermined area and the surrounding area of the predetermined area.

(3) The method of (1) or (2), wherein generating the one or more adversarial example comprises:

generating the one or more adversarial example based on a model of a generic machine-learning based vision system.

(4) The method of any one of (1) to (3), wherein generating the one or more adversarial example comprises:

generating the one or more adversarial example based on information about a model series of the UAV.

(5) The method of (4), wherein generating the one or more adversarial example based on the information about the model series of the UAV comprises:

selecting a generation model from a plurality of generation model based on the information about the model series of the UAV; and generating the one or more adversarial example with the selected generation model.

(6) The method of (4) or (5), further comprising:

monitoring an air space of at least one of the predetermined area and the surrounding area of the predetermined area with one or more camera;

determining, based on output data of the one or more camera, whether the UAV is present in the air space; and if it is determined that the UAV is present in the air space, determining the model series of the UAV based on the output data of the one or more camera.

(7) The method of (6), wherein determining the model series of the UAV is done in realtime.

(8) The method of any one of (1) to (7), wherein the one or more adversarial example is generated using a trained machine-learning model.

(9) The method of any one of (1) to (8), further comprising: placing the one or more adversarial example at the respective determined position.

(10) The method of (9), wherein placing the one or more adversarial example at the respective determined position comprises one or more of the following:

positioning one or more object showing a respective one of the one or more adversarial example at the respective determined position;

projecting at least one of the one or more adversarial example onto a respective object at the respective determined position;

positioning one or more display displaying a respective one of the one or more adversarial example at the respective determined position; and causing one or more defending UAV equipped with a respective one of the one or more adversarial example to fly at the respective determined position.

(11) An apparatus for defending a predetermined area from an autonomously moving UAV, the apparatus comprising:

input interface circuitry configured to receive geographical information about at least one of the predetermined area and a surrounding area of the predetermined area; and processing circuitry configured to:

generate one or more adversarial example adapted to disrupt a machine-learning based vision system of the UAV; and determine, based on the geographical information, a respective position for the one or more adversarial example in at least one of the predetermined area and the surrounding area of the predetermined area.

(12) The apparatus of (11), wherein, for determining the respective position for the one or more adversarial example, the processing circuitry is configured to:

determine a respective ideal theoretical position for the one or more adversarial example;

determine, based on the geographical information about the at least one of the predetermined area and the surrounding area of the predetermined area, one or more geophysical constraint for placement of the one or more adversarial example; and determine, based on the one or more geophysical constraint and the respective ideal theoretical position for the one or more adversarial example, the respective position of the one or more adversarial example in the at least one of the predetermined area and the surrounding area of the predetermined area.

(13) The apparatus of (11) or (12), wherein the processing circuitry is configured to generate the one or more adversarial example based on a model of a generic machine-learning based vision system.

(14) The apparatus of any one of (11) to (13), wherein the processing circuitry is configured to generate the one or more adversarial example based on information about a model series of the UAV.

(15) The apparatus of (14), wherein, for generating the one or more adversarial example based on the information about the model series of the UAV, the processing circuitry is configured to:

select a generation model from a plurality of generation models based on the information about the model series of the UAV; and generate the one or more adversarial example with the selected generation model.

(16) The apparatus of (14) or (15), further comprising one or more camera configured to monitor an air space of at least one of the predetermined area and a surrounding area of the predetermined area, wherein the processing circuitry is further configured to:

determine, based on output data of the one or more camera, whether the UAV is present in the air space; and if it is determined that the UAV is present in the air space, determine the model series of the UAV based on the output data of the one or more camera.

(17) The apparatus of (16), wherein the processing circuitry is configured to determine the model series of the UAV in real-time.

(18) The apparatus of any one of (11) to (17), wherein the processing circuitry is configured to generate the one or more adversarial example using a trained machine-learning model.

(19) The apparatus of any one of (11) to (18), wherein the processing circuitry is further configured to:

generate control data for one or more optical projector to control the one or more optical projector to project a respective one of the one or more adversarial example onto a respective object at the respective determined position; and/or generate control data for one or more display at the respective determined position to control the one or more display to display a respective one of the one or more adversarial example; and/or generate control data for one or more defending UAV equipped with a respective one of the one or more adversarial example to control the one or more defending UAV to fly at the respective determined position, and wherein the apparatus further comprises output interface circuitry configured to output the control data.

(20) A non-transitory machine-readable medium having stored thereon a program having a program code for performing the method according to any one of (1) to (8), when the program is executed on a processor or a programmable hardware.

(21) A program having a program code for performing the method according to any one any one of (1) to (8), when the program is executed on a processor or a programmable hardware.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A method for defending a predetermined area from an autonomously moving Unmanned Aerial Vehicle, UAV, the method comprising:

generating one or more adversarial example adapted to disrupt a machine-learning based vision system of the UAV;

determining, based on geographical information about at least one of the predetermined area and a surrounding area of the predetermined area, a respective position for the one or more adversarial example in at least one of the predetermined area and the surrounding area of the predetermined area; and controlling one or more defending UAV equipped with a respective one of the one or more adversarial example to fly at the respective determined position.

2. The method of claim 1, wherein determining the respective position for the one or more adversarial example comprises:

determining a respective ideal theoretical position for the one or more adversarial example;

determining, based on the geographical information about the at least one of the predetermined area and the surrounding area of the predetermined area, one or more geophysical constraint for placement of the one or more adversarial example; and determining, based on the one or more geophysical constraint and the respective ideal theoretical position for the one or more adversarial example, the respective position of the one or more adversarial example in the at least one of the predetermined area and the surrounding area of the predetermined area.

3. The method of claim 1, wherein generating the one or more adversarial example comprises:

generating the one or more adversarial example based on a model of a generic machine-learning based vision system.

4. The method of claim 1, wherein generating the one or more adversarial example comprises:

generating the one or more adversarial example based on information about a model series of the UAV.

5. The method of claim 4, wherein generating the one or more adversarial example based on the information about the model series of the UAV comprises:

selecting a generation model from a plurality of generation model based on the information about the model series of the UAV; and generating the one or more adversarial example with the selected generation model.

6. The method of claim 4, further comprising:
monitoring an air space of at least one of the predetermined area and the surrounding area of the predetermined area with one or more camera;
determining, based on output data of the one or more camera, whether the UAV is present in the air space; and
if it is determined that the UAV is present in the air space, determining the model series of the UAV based on the output data of the one or more camera.

7. The method of claim 6, wherein determining the model series of the UAV is done in real-time.

8. The method of claim 1, wherein the one or more adversarial example is generated using a trained machine-learning model.

9. The method of claim 1, further comprising:
determining another respective position for another adversarial example; and
placing another adversarial example at the another respective determined position.

10. The method of claim 9, wherein placing the another adversarial example at the respective determined position comprises one or more of the following:
positioning one or more object showing the another adversarial example at the another determined position;
projecting the another adversarial example onto a respective object at the another determined position; and
positioning one or more display displaying showing the another adversarial example at the another determined position.

11. An apparatus for defending a predetermined area from an autonomously moving Unmanned Aerial Vehicle, UAV, the apparatus comprising:
input interface circuitry configured to receive geographical information about at least one of the predetermined area and a surrounding area of the predetermined area; and
processing circuitry configured to:
generate one or more adversarial example adapted to disrupt a machine-learning based vision system of the UAV;
determine, based on the geographical information, a respective position for the one or more adversarial example in at least one of the predetermined area and the surrounding area of the predetermined area; and
generate control data for one or more defending UAV equipped with a respective one of the one or more adversarial example to control the one or more defending UAV to fly at the respective determined position.

12. The apparatus of claim 11, wherein, for determining the respective position for the one or more adversarial example, the processing circuitry is configured to:
determine a respective ideal theoretical position for the one or more adversarial example;
determine, based on the geographical information about the at least one of the predetermined area and the surrounding area of the predetermined area, one or more geophysical constraint for placement of the one or more adversarial example; and
determine, based on the one or more geophysical constraint and the respective ideal theoretical position for the one or more adversarial example, the respective position of the one or more adversarial example in the at least one of the predetermined area and the surrounding area of the predetermined area.

13. The apparatus of claim 11, wherein the processing circuitry is configured to generate the one or more adversarial example based on a model of a generic machine-learning based vision system.

14. The apparatus of claim 11, wherein the processing circuitry is configured to generate the one or more adversarial example based on information about a model series of the UAV.

15. The apparatus of claim 14, wherein, for generating the one or more adversarial example based on the information about the model series of the UAV, the processing circuitry is configured to:
select a generation model from a plurality of generation models based on the information about the model series of the UAV; and
generate the one or more adversarial example with the selected generation model.

16. The apparatus of claim 14, further comprising one or more camera configured to monitor an air space of at least one of the predetermined area and a surrounding area of the predetermined area, wherein the processing circuitry is further configured to:
determine, based on output data of the one or more camera, whether the UAV is present in the air space; and
if it is determined that the UAV is present in the air space, determine the model series of the UAV based on the output data of the one or more camera.

17. The apparatus of claim 16, wherein the processing circuitry is configured to determine the model series of the UAV in real-time.

18. The apparatus of claim 11, wherein the processing circuitry is configured to generate the one or more adversarial example using a trained machine-learning model.

19. The apparatus of claim 11, wherein the processing circuitry is further configured to:
determine another respective position for another adversarial example;
generate control data for one or more optical projector to control the one or more optical projector to project another adversarial example onto a respective object at the another determined position; and/or
generate control data for one or more display at the another determined position to control the one or more display to display another adversarial example,
wherein the apparatus further comprises output interface circuitry configured to output the control data.

20. A non-transitory machine-readable medium having stored thereon a program having a program code for performing the method according to claim 1, when the program is executed on a processor or a programmable hardware.

* * * * *